(12) United States Patent
Shinzou (10) Patent No.: US 7,277,642 B2
(45) Date of Patent: Oct. 2, 2007

(54) FINE DISPLACEMENT DETECTION DEVICE BY SOUND OR THE LIKE

(75) Inventor: Toru Shinzou, Sagamihara (JP)

(73) Assignee: Kabushiki Kaisha Kenwood, Tokyo (JP)

(*) Notice: Subject to any disclaimer, the term of this patent is extended or adjusted under 35 U.S.C. 154(b) by 701 days.

(21) Appl. No.: 10/416,227

(22) PCT Filed: Nov. 2, 2001

(86) PCT No.: PCT/JP01/09639

§ 371 (c)(1),
(2), (4) Date: May 8, 2003

(87) PCT Pub. No.: WO02/39053

PCT Pub. Date: May 16, 2002

(65) Prior Publication Data

US 2004/0099799 A1 May 27, 2004

(30) Foreign Application Priority Data

Nov. 10, 2000 (JP) ............................. 2000-344107

(51) Int. Cl.
*H04B 10/06* (2006.01)

(52) U.S. Cl. ..................................... 398/133; 398/132

(58) Field of Classification Search ................ 398/198, 398/195, 132–134; 353/121; 359/153, 154; 356/614, 624
See application file for complete search history.

(56) References Cited

U.S. PATENT DOCUMENTS 5,262,884 A * 11/1993 Buchholz ..................... 398/134
5,726,962 A *  3/1998 Okada et al. ............. 369/44.23

(Continued)

FOREIGN PATENT DOCUMENTS

JP          10-294527           11/1998

(Continued)

OTHER PUBLICATIONS

International Search Report dated Feb. 5, 2002.

(Continued)

*Primary Examiner*—Leslie Pascal
(74) *Attorney, Agent, or Firm*—Eric J. Robinson; Robinson Intellectual Property Law Office, P.C.

(57) ABSTRACT

A fine displacement detection device by sound or the like: which can easily align individual optical components; which disposes a light emitting element (13) and a light receiving element (14) on a substrate, emits light from the light emitting element (13) to a diaphragm (1) set at a position facing the substrate, receives light reflected from the diaphragm (1) by the light receiving element (14), and detects as an electric signal the fine displacement of the diaphragm (1) by sound or the like; and which provides, on the optical paths of the substrate and the diaphragm (1), a focusing element (2) that focuses an incidence light from the light emitting element (13) for leading to the diaphragm (1) and focuses a diverged/reflected light from the diaphragm (1) for leading to the light receiving element (14), and a reflected light flux dividing element (3) that divides the diverged/reflected light focused by the focusing element (2) for leading to the light receiving element (14).

7 Claims, 10 Drawing Sheets

U.S. PATENT DOCUMENTS

| | | | |
|---|---|---|---|
| 6,108,090 A * | 8/2000 | Ishihara | 356/601 |
| 6,207,942 B1 * | 3/2001 | Ohyama | 250/201.5 |
| 6,215,585 B1 * | 4/2001 | Yoshimura et al. | 359/344 |
| 6,301,034 B1 * | 10/2001 | Speciale | 398/134 |
| 6,586,721 B2 * | 7/2003 | Estevez-Garcia | 250/221 |
| 2006/0007837 A1 * | 1/2006 | Arai et al. | 369/112.01 |

FOREIGN PATENT DOCUMENTS

| | | |
|---|---|---|
| JP | 11-296873 | 10/1999 |
| JP | 2000-287286 | 10/2000 |
| JP | 2001-119796 | 4/2001 |
| JP | 2001-204097 | 7/2001 |

OTHER PUBLICATIONS

Notification of Examiner Refusal Reason, JP 2000-344107, Japanese Patent Office, Oct. 7, 2003.

* cited by examiner

$\theta = \sin^{-1}(\lambda/P)$
$d = z \times \tan\theta$

$\theta$ : HOLOGRAM DIFFRACTION ANGLE
$\lambda$ : OSCILLATION WAVELENGTH OF LIGHT EMITTING ELEMENT
$P$ : HOLOGRAM REFERENCE PITCH
$d$ : DISTANCE BETWEEN LIGHT EMITTING ELEMENT AND LIGHT RECEIVING ELEMENT
$z$ : DISTANCE BETWEEN LIGHT EMITTING AND RECEIVING ELEMENT AND HOLOGRAM

FIG. 7

PRIOR ART

FIG. 8

PRIOR ART

FIG. 9

PRIOR ART

FIG. 10

PRIOR ART

PRIOR ART

FINE DISPLACEMENT DETECTION DEVICE BY SOUND OR THE LIKE

TECHNICAL FIELD

The present invention relates to a device for detecting a fine displacement by sound or the like, capable of detecting the vibration of a diaphragm by sound or the like as a fine displacement to detect the vibration as an electric signal.

BACKGROUND ART

An optical microphone device has been known as a fine displacement detection device using a acoustic electric element.

The outline of a conventional device will be described using the optical microphone device as an example of a fine vibration detection device.

Figure 7:
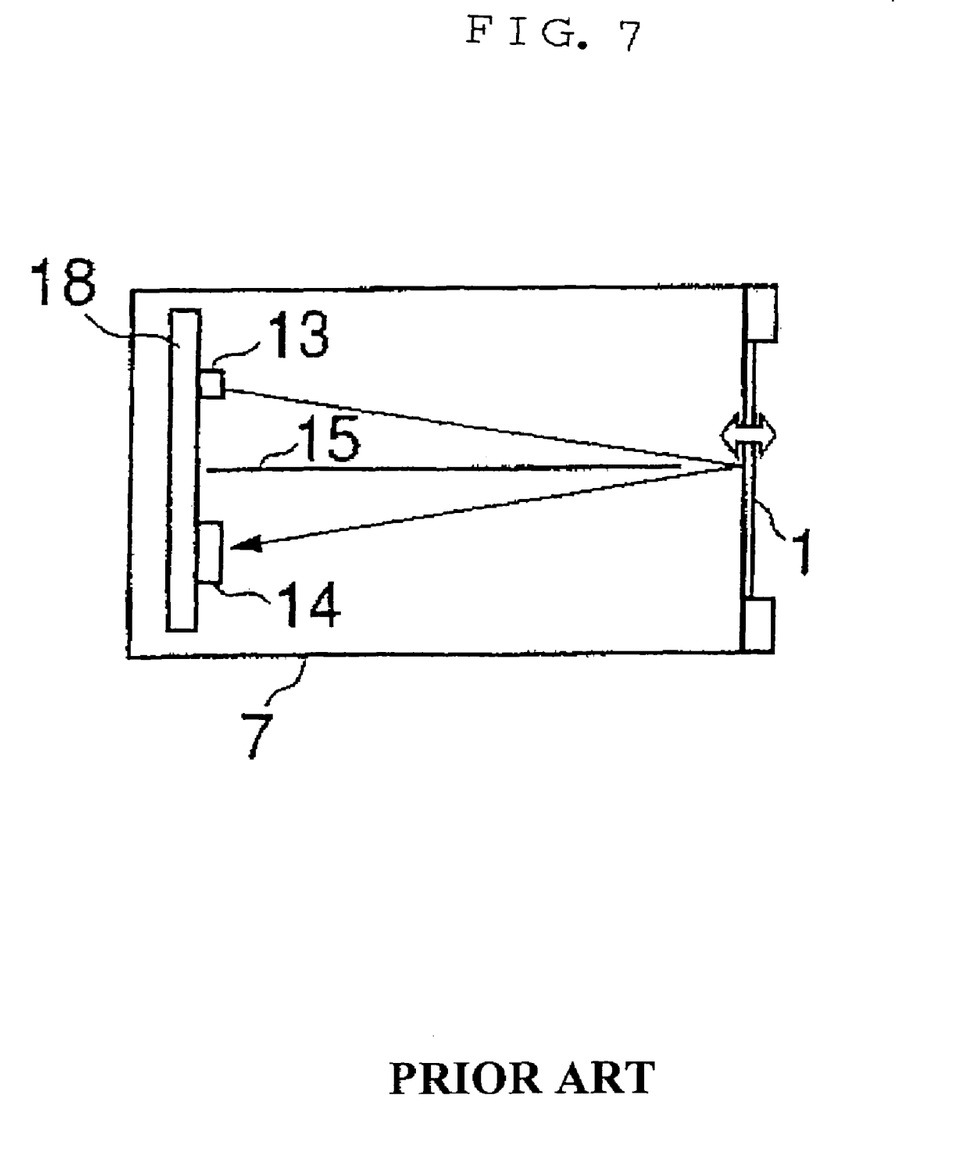
FIG. 7 shows one example of a conventional fine displacement detection device.

The device shown in FIG. 7 has a structure such that a diaphragm 1 vibrating finely by sound or the like is provided in an opening provided in part of a detection device case 7, and a light emitting element 13 and a light receiving element 14 are placed on a substrate 18 placed at a position facing the diaphragm 1.

Also, a blackout wall 15 is provided between the light emitting element 13 and the light receiving element 14 so that incident light from the light emitting element 13 is prevented from directly coming into the light receiving element 14. Due incident light from the light emitting element 13 undergoes a change in the amount of its reflected light coming into the receiving element 14. It is possible to achieve an operation as the optical microphone device by detecting the change in the amount of incident light as an electric signal by the light receiving element 14.

Figure 8:
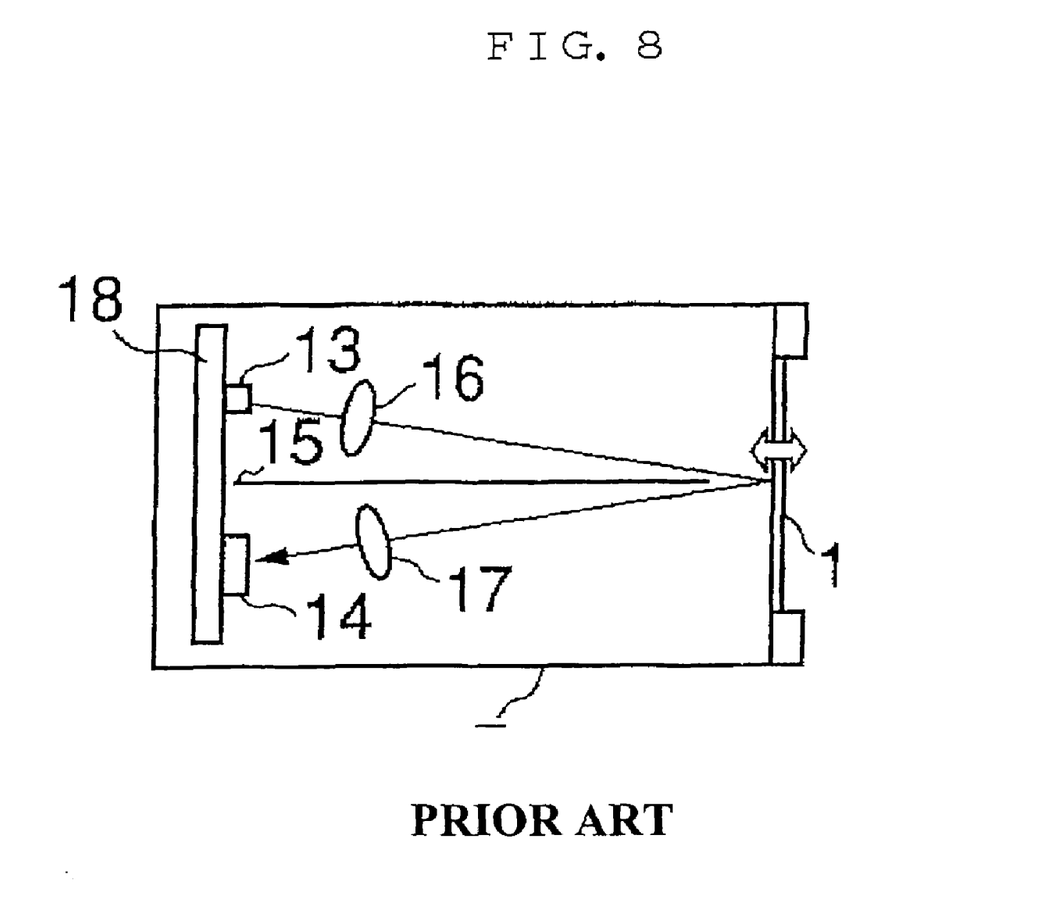
FIG. 8 shows one example of another conventional fine displacement detection device.

In the device shown in FIG. 8, a condensing lens 16 and a converging lens 17 are provided on an optical path between the light emitting element 13 and the diaphragm 1 and an optical path between the diaphragm 1 and the light receiving element 14, respectively.

By providing the condensing lens 16 and the diverging lens 17, the amount of reflected light from the diaphragm 1 coming into the light receiving element 14 can be increased.

Figure 9:
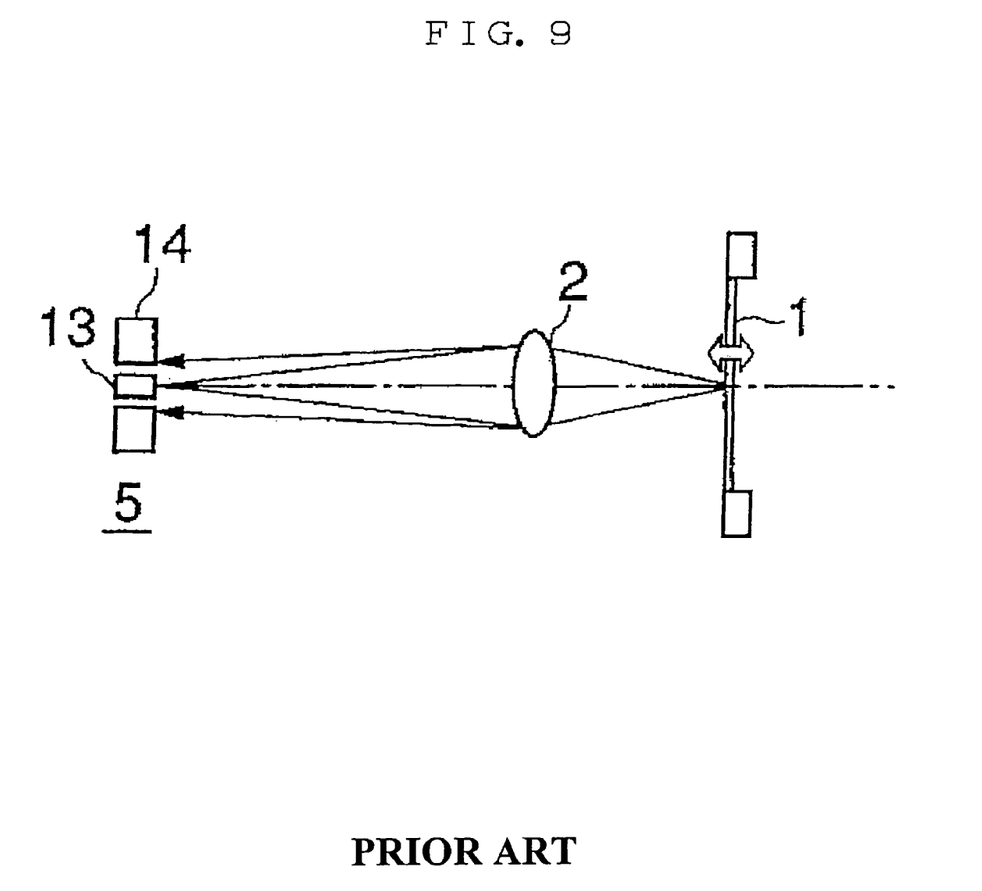
FIG. 9 shows one example of still another conventional fine displacement detection device.

In FIG. 9, a light emitting and receiving element 5 with the light emitting element and the light receiving element combined as one united body in such a manner that a vertical resonator type surface light emitting laser element with the distribution of emitted light intensity being almost uniform on the concentric circle is used as the light emitting element 13, and the light receiving element 14 is placed on the concentric circle so as to surround the light emitting element 13 with the light emitting element 13 situated at the center is used, and a light condensing element 2 converging incident light from the light emitting element 13 and leading the same to the diaphragm 1, and also converging divergent reflected light from the diaphragm 1 and leading the same to the light receiving element 14 is provided on an optical path between the light emitting and receiving element 5 and the diaphragm 1.

A circular surface light emitting laser element is placed at the center of the substrate, and the light receiving element is placed on the concentric circle so as to surround this surface light emitting laser element to fabricate the light emitting and receiving element 5. The surface light emitting laser element generally has a characteristic such that the distribution of emitted light intensity is almost uniform on the concentric circle.

Therefore, emitted light emitted toward the diaphragm 1 at a predetermined angle from the light emitting element 13 placed at the center on the concentric circle with same intensity. Then, the diaphragm 1 vibrates, whereby the reflection angle is changed, and the light reaches the light receiving element 14 on the concentric circle.

Therefore, by detecting a change in the amount of light received by the light receiving element 14 placed on the concentric circle, the vibration displacement of the diaphragm 1 can be detected.

By employing this structure, not only the amount of incident reflected light can considerably be increased, but also the device can be scaled down.

Problems to be Solved by the Invention

Figure 10:
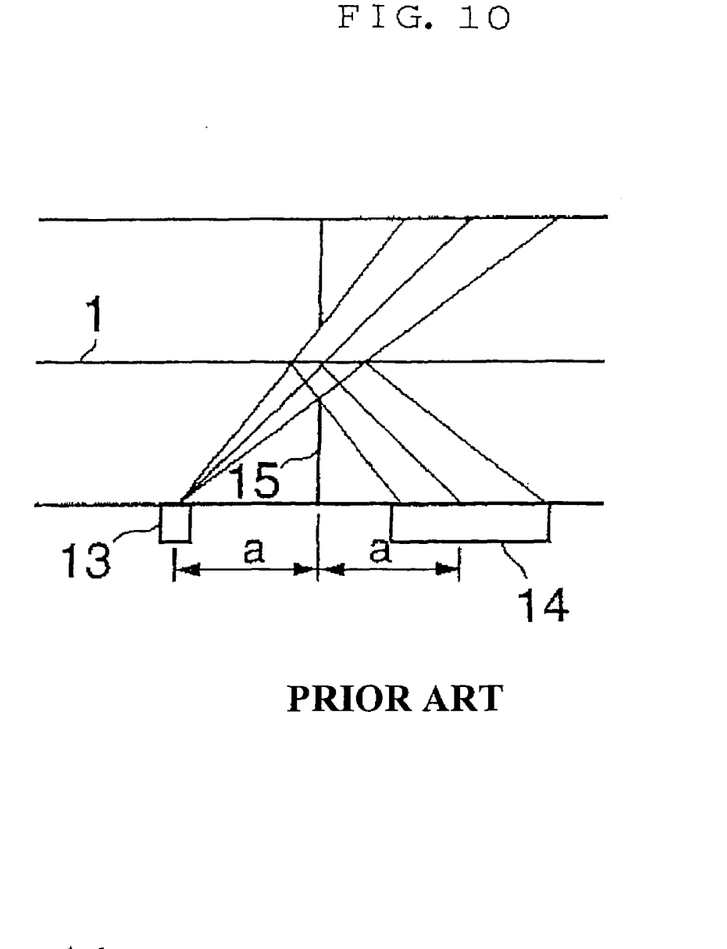
FIG. 10 shows a tunnel diagram of the device of FIG. 7.

FIG. 10 shows a tunnel diagram of the device of FIG. 7, indicating that the light emitting element 13 and the light receiving element 14 each should be placed at a certain distance a with respect to the blackout wall 15.

Also, in FIG. 9, the light receiving element 14 should be placed on the concentric circle so as to surround the surface light emitting laser element placed at the center of the substrate.

This conventional device for detecting a fine displacement by sound has an disadvantage that since the structure and layout of the light receiving element relative to the light emitting element are limited for securing sufficient light reception sensitivity, it is difficult to simplify light emitting and light receiving element units, and the production step is thus complicated.

Also, if reflected light flux dividing means other than a hologram is used, there arise disadvantages that the number of optical parts is increased and the device is scaled up, and that the alignment of each optical part is complicated and so on.

The present invention has been devised for solving the problems described above, and has as its object the provision of a fine displacement detection device in which a reflected light flux dividing element for dividing converged reflected light is provided between the light condensing element and the light emitting and receiving element, whereby the degree of freedom for the structure and layout of the light receiving element is enhanced, and the step of producing the light emitting and receiving element can be simplified, and the light condensing element is achieved by a micro lens or hologram lens formed on the plane substrate, and the reflected light flux dividing element is achieved by the hologram formed on the plane substrate, whereby the number of optical parts can be reduced and the device can be scaled down, and thus the alignment of each optical part can easily be achieved.

DISCLOSURE OF THE INVENTION

The present invention provides a device for detecting a fine displacement by sound or the like in which a light emitting element and a light receiving element are placed on a substrate, light is emitted from the above described light emitting element to a diaphragm placed at a position facing the above described substrate, and reflected light from the above described diaphragm is received by the above described light receiving element to detect a fine displacement of the above described diaphragm by sound or the like as an electric signal, wherein a light condensing element converging incident light from the above described light emitting element and leading the same to the above described diaphragm, and also converging divergent reflected light from the above described diaphragm and leading the same to the above described light receiving element, and a reflected light flux dividing element dividing the above described divergent reflected light converged by the above described light condensing element and leading the same to the above described light receiving element are provided on an optical path between the above described substrate and the above described diaphragm.

Also, the above described fine displacement detection device is characterized in that a micro lens or hologram lens placed on a plane substrate is used as the above described light condensing element.

Also, the above described fine displacement detection device is characterized in that a hologram formed on the plane substrate is used as the above described reflected light flux dividing element.

Also, the above described fine displacement detection device is characterized in that the above described light emitting element and the above described light receiving element are attached and placed on the same plane substrate.

In addition, in the above described fine displacement detection device, the above described light condensing element and the above described reflected light flux dividing element are combined together.

The present invention further provides a fine displacement detection device in which light emitting element and a light receiving element are placed on a substrate, light is emitted from the above described light emitting element to a diaphragm placed at a position facing the above described substrate, and reflected light from the above described diaphragm is received by the above described light receiving element to detect a fine displacement of the above described diaphragm by sound or the like as an electric signal, wherein a first light condensing element converging incident light from the above described light emitting element and leading the same to the above described diaphragm, and a second light condensing element converging divergent reflected light from the above described diaphragm and leading the same to the above described light receiving element are provided on an optical path between the above described substrate and the above described diaphragm.

Also, the above described fine displacement detection device is characterized in that holograms formed on the plane substrate are used as the above described first light condensing element and the above described second light condensing element.

Also, the above described fine displacement detection device is characterized in that the above described light emitting element and the above described light receiving element are attached and placed on the same plane substrate.

In addition, any of the above described fine displacement detection devices is characterized in that a vertical resonator type surface light emitting laser element is used as the above described light emitting element.

BEST MODE FOR CARRYING OUT THE INVENTION

Figure 1:
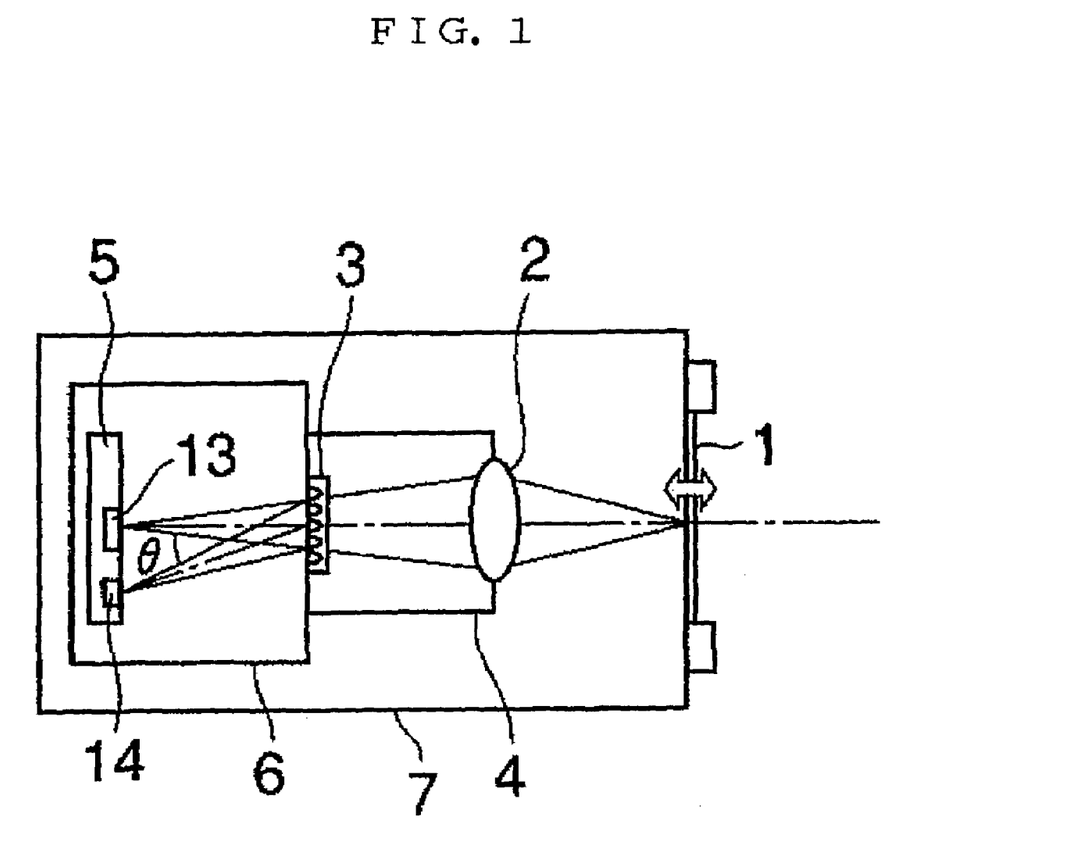
FIG. 1 shows the first embodiment of the present invention.
Figure 2:
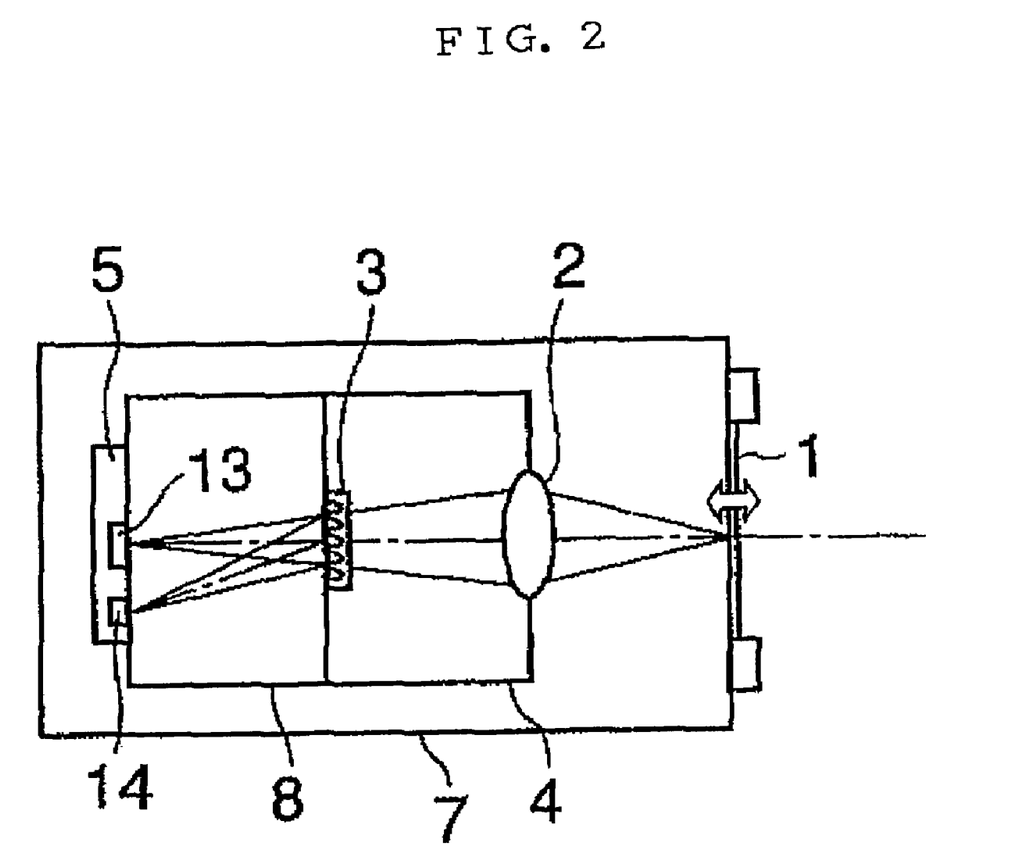
FIG. 2 shows the second embodiment of the present invention.
Figure 3:
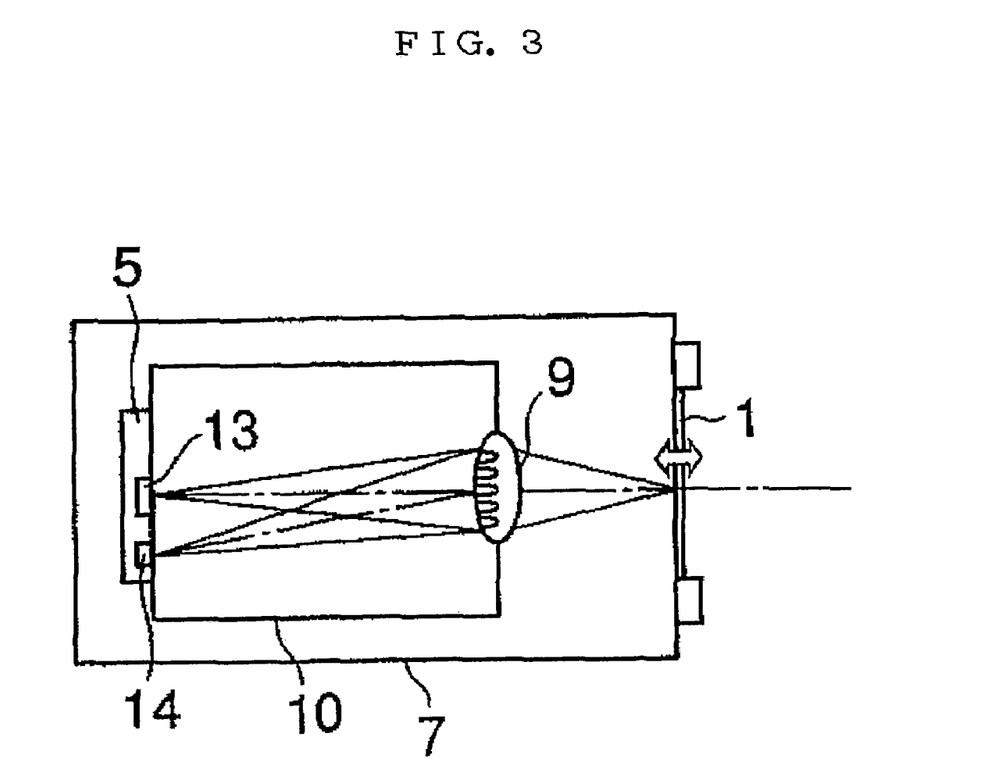
FIG. 3 shows the third embodiment of the present invention.

FIGS. 1 to 3 each show the embodiment of a device for detecting a fine displacement by sound or the like according to the present invention. Furthermore, embodiments shown in FIGS. 1 to 3 each employ a structure in which a light emitting element 13 and a light receiving element 14 are formed on the same substrate.

A vertical resonator type surface light emitting laser element may be used as the light emitting element, and a photodiode may be used as the light receiving element.

A light emitting and receiving element 5 configured in this way is placed in a light receiving and emitting unit case 6.

Then, a parallel plane substrate 4 with a light condensing element 2 and a reflected light flux dividing element 3 formed on opposite edges parallel to each other, respectively, is placed.

One end of the detection device case 7 is opened, and this opening portion is provided with a diaphragm 1, which vibrates finely by external sound. The light emitting element 13, the center of the reflected light flux dividing element 3, the center of the light condensing element 2 and the center of the diaphragm 1 are each located on the same line.

A micro lens or hologram lens is used as the light condensing element 2. The hologram is a type of diffraction grating with a large number of grooves formed on the surface of glass or the like. The traveling direction of the light beam impinging on the surface can be refracted (diffracted) at a certain angle depending on the pattern of the groove, or the surface can be made to serve as a lens. Also, the term "micro lens" is particularly used for emphasizing that it is small compared with the conventional macro lens, and usually refers to a small lens with the diameter of several µm to several mm. The micro lens can be formed on a glass substrate by a selective ion exchange method, a reactive ion etching method or the like, and the hologram and the hologram lens can be formed on a glass substrate by etching. This method is advantageous in that a large number of elements can be prepared at a time as in the case of wafer process, thus making it possible to ensure alignment accuracy within 1 µm. The light condensing element 2 and the reflected light flux dividing element 3 are preferably formed on the same glass substrate.

Emitted light from the light emitting element 13 in the light emitting and receiving element 5 reaches the hologram constituting the reflected light flux dividing element 3 at a predetermined emission angle, and zero order diffraction light comes into the light condensing element 2. That is, the dividing element 3 divides the incoming light flux into a plurality of light fluxes (zero-order, ±first order, ±second order, . . . in the case of diffraction grating).

Here, a micro lens or hologram lens may be used for the light condensing element 2. If the light condensing element 2 is a micro lens, incident light is refracted and converged on the diaphragm 1. Also, if the light condensing element 2 is a hologram lens, incident light is diffracted and converged on the diaphragm 1 as first order diffraction light.

Divergent reflected light reflected by the diaphragm 1 and diverged by vibration is again converged by the light condensing element 2 and comes into the reflected light flux dividing element 3. The divergent reflected light coming into the reflected light flux dividing element 3 undergoes a change in the traveling direction as first diffraction light by this hologram, and is converged on the light receiving element 14 on the light receiving element 5.

Here, when the diaphragm 1 vibrates by sound or the like, the position at which the incident light converged by the light condensing element 2 is reflected is changed and at the same time, the convergence state of the divergent reflected light converged on the light emitting and receiving element 5 is changed, resulting in an apparent change in the vibration width.

The change in the convergence state, namely the change in the amount of incoming reflected light is detected as a change of the electric signal by the light receiving element 14, whereby the amount of vibration displacement of the diaphragm 1 by sound or the like can be detected. For the method for detecting the change in the amount of incoming reflected light, a beam size method, an astigmatism method, a Foucault method and the like are known.

Furthermore, FIG. 2 shows an example of the light emitting and receiving element 5 attached and placed directly on a plane substrate 8. Furthermore, the light emitting and receiving element 5 can be attached and placed by flip chip bonding or the like.

In this way, the accuracy of the position of the reflected light flux dividing element 3 relative to the light emitting and receiving element can be improved, and the production step can be simplified.

FIG. 3 shows a situation in which in the case where the light condensing element 2 is a micro lens in the device shown in FIG. 1, a hologram is formed on this micro lens to form the reflected light flux dividing element, and the light condensing element and the reflected light flux dividing element are combined together to form a light condensing/dividing element 9.

The light condensing/dividing element 9 formed in this way is placed on a plane substrate 10 with the light emitting and receiving element 5 attached and placed thereon, whereby the structure and alignment of the device can further be simplified.

Figure 4:
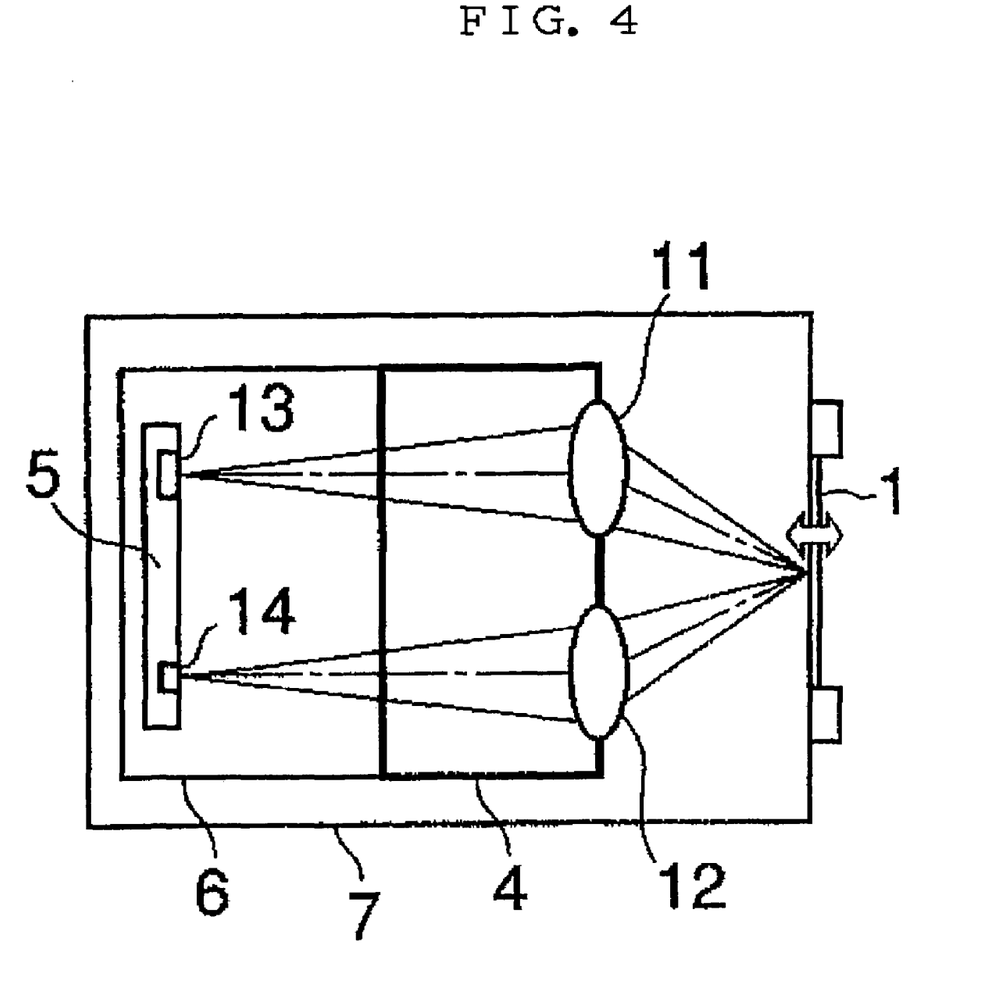
FIG. 4 shows the fourth embodiment of the present invention.
Figure 5:
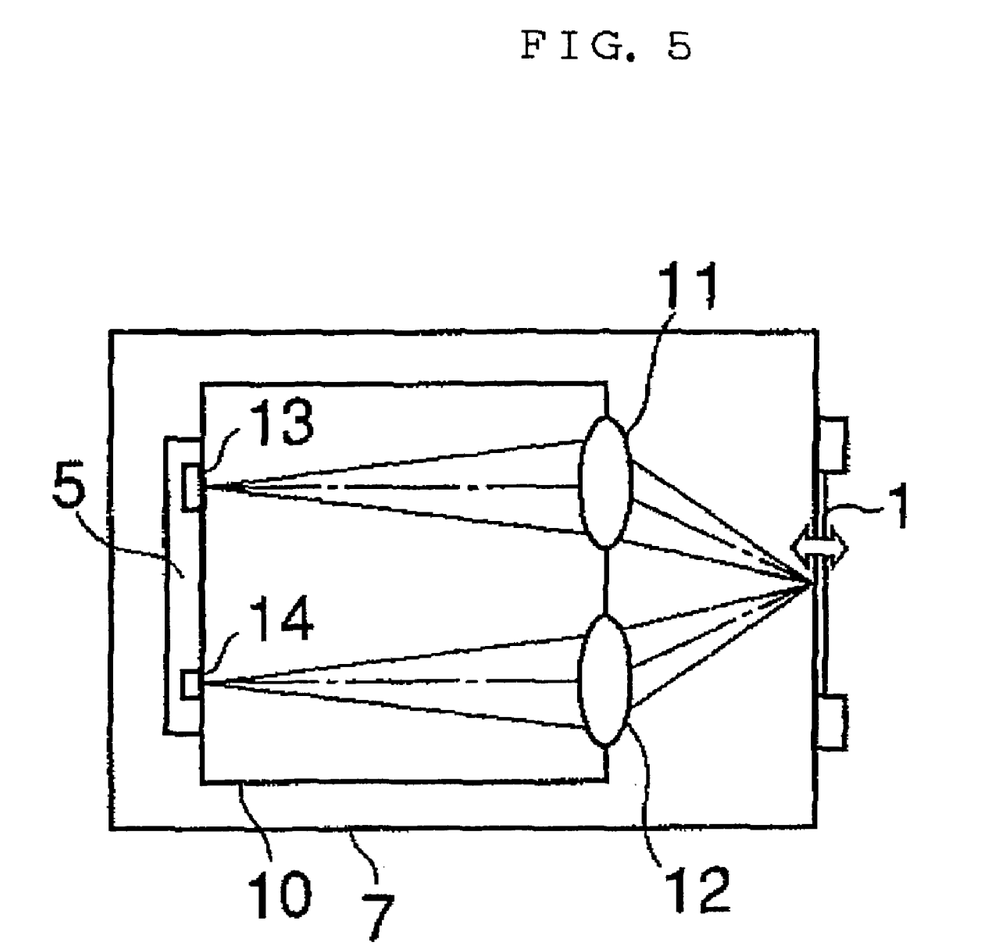
FIG. 5 shows the fifth embodiment of the present invention.

FIGS. 4 and 5 each show another embodiment of the present invention.

A light condensing element 11 converging emitted light from the light emitting element 13 and a converging element converging divergent reflected light from the diaphragm 1 are separately provided, and hologram lenses are used for these light condensing elements 11 and 12. Emitted light emitted from the light emitting element 13 undergoes a change in the traveling direction as diffraction light by the light condensing element 11 constituted by a hologram lens, and is converged on the diaphragm 1.

Also, divergent reflected light emitted from the diaphragm 1 undergoes a change in the traveling direction as first-order diffraction light by the light condensing element 12 constituted by a hologram lens, and is converged on the light receiving element 14.

FIG. 5 shows the light emitting and receiving element 5 attached directly on a plane substrate 10 in FIG. 4.

In this way, the accuracy of the positions of hologram lenses 11 and 12 can be improved, and the production step can be simplified compared with the case where the light emitting and receiving element 5 is placed in the light receiving and emitting unit case 6 as shown in FIG. 4. The lenses 11 and 12 of FIGS. 4 and 5 are preferably formed on the same glass substrate.

Figure 6:
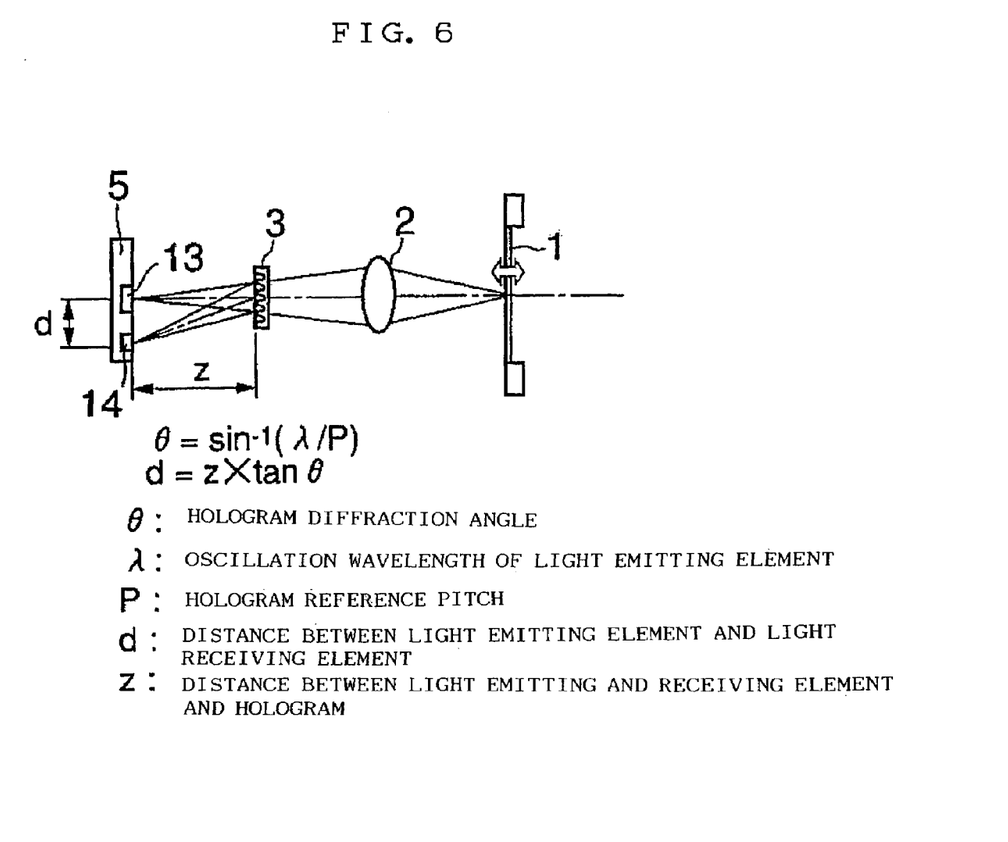
FIG. 6 illustrates the operation principle of the present invention.

FIG. 6 illustrates the operation principle of the present invention, and corresponds to the structure shown in FIG. 1.

Here, $\theta$ represents a diffraction angle of the hologram, $\lambda$ represents an oscillation wavelength of the light emitting element 13, P represents a reference pitch, d represents a distance between the light emitting element 13 and the light receiving element 14, and z represents a distance between the light emitting and receiving element 5 and the hologram 3.

The diffraction angle of the hologram is defined as $\theta = \sin^{-1}(\lambda/P)$, and the distance between the light emitting element and the light receiving element is defined as $d = z \times \tan \theta$.

Now, the relation between the hologram reference pitch P and the distance d between the light emitting element and the light receiving element when the oscillation wavelength $\lambda$ of the light emitting element is 780 nm, and the distance z between the light emitting and receiving element and the hologram is 0.5 mm is shown in Table 1.

TABLE 1

| z mm | Wavelength nm | Reference pitch um | θ deg | d mm |
|---|---|---|---|---|
| 0.5 | 780 | 1 | 51.261 | 0.623 |
| 0.5 | 780 | 2 | 22.954 | 0.212 |
| 0.5 | 780 | 3 | 15.070 | 0.135 |
| 0.5 | 780 | 4 | 11.245 | 0.099 |
| 0.5 | 780 | 5 | 8.975 | 0.079 |
| 0.5 | 780 | 6 | 7.470 | 0.066 |
| 0.5 | 780 | 7 | 6.398 | 0.056 |
| 0.5 | 780 | 8 | 5.595 | 0.049 |
| 0.5 | 780 | 9 | 4.972 | 0.043 |
| 0.5 | 780 | 10 | 4.474 | 0.039 |

Thus, the convergence position on the light emitting and receiving element 5 can be changed by changing the reference pitch P of the hologram.

Furthermore, the present invention is not limited to optical microphone devices, and is applied for optical sensors or the like as a matter of course.

ADVANTAGES OF THE INVENTION

As described above in detail, in the present invention, the reflected light flux dividing element dividing divergent reflected light converged by the light condensing element and leading the same to the light receiving element to increase the degree of freedom for the structure and layout of the light receiving element, thus making it possible to simplify the production of the light emitting and receiving element.

Also, a fine displacement detection device making it possible to reduce the number of optical parts and scale down the device and capable of easily aligning each optical part can be achieved.

The invention claimed is:

1. A fine displacement detection device comprising a diaphragm and a pair of light emitting element and a light receiving element, in which light is emitted from said light emitting element to said diaphragm, and reflected light from said diaphragm is received by said light receiving element to detect a fine displacement of said diaphragm as an electric signal, wherein a glass plate (4) having a first and second end surfaces opposing each other in a parallel alignment, the first end surface being provided with a light condensing element (2) and the second end surface being provided with a reflected light flux dividing element, the light condensing element converging light from said light emitting element and leading the same to said diaphragm, and also converging reflected light from said diaphragm and leading the same to said light receiving element, and the reflected light flux dividing element dividing said reflected light converged by said light condensing element into a plurality of reflected light fluxes of different directions and leading at least one of the plurality of reflected light fluxes to said light receiving element, wherein said light condensing element is disposed on the first end surface and said reflected light flux dividing element is disposed on the second end surface.

2. The fine displacement detection device according to claim 1, wherein a micro lens or hologram lens is formed in the first end surface as said light condensing element.

3. The fine displacement detection device according to claim 1, wherein a hologram formed on a plane substrate is formed in the second end surface as said reflected light flux dividing element.

4. The fine displacement detection device according to claim 1, wherein said light emitting element and said light receiving element are attached and placed on the same plane base.

5. The fine displacement detection device according to claim 1, wherein said light emitting element is a vertical resonator type surface light emitting laser element.

6. A fine displacement detection device comprising a diaphragm (1) and a pair of light emitting element (13) and a light receiving element (14) in which light is emitted from said light emitting element to said diaphragm and reflected light from said diaphragm is received by said light receiving element to detect a fine displacement of said diaphragm as an electrical signal, wherein a glass plate (10) having a first and second end surfaces opposing each other in a parallel alignment, the first end surface being provided with a light condensing element and a reflected light flux dividing element, and the second end surface being provided with said pair of light emitting element and a light receiving element, wherein said light condensing element is a micro lens and said light flux dividing element is a hologram formed on a surface of the micro lens.

7. The fine displacement detection device according to claim 1, wherein said light emitting element is a vertical resonator type surface light emitting laser element.

* * * * *